(12) United States Patent
Ben-Eli

(10) Patent No.: US 7,447,512 B2
(45) Date of Patent: *Nov. 4, 2008

(54) METHOD AND SYSTEM FOR ALLOCATION OF RESOURCES WITHIN WIRELESS SYSTEMS

(75) Inventor: David Ben-Eli, Modiin (IL)

(73) Assignee: Intel Corporation, Santa Clara, CA (US)

( * ) Notice: Subject to any disclaimer, the term of this patent is extended or adjusted under 35 U.S.C. 154(b) by 201 days.

This patent is subject to a terminal disclaimer.

(21) Appl. No.: 11/418,623

(22) Filed: May 4, 2006

(65) Prior Publication Data

US 2006/0205425 A1  Sep. 14, 2006

Related U.S. Application Data

(62) Division of application No. 10/211,861, filed on Aug. 1, 2002, now Pat. No. 7,099,682.

(51) Int. Cl.
*H04B 7/00* (2006.01)
*H04B 15/00* (2006.01)
*H04Q 7/20* (2006.01)

(52) U.S. Cl. .................. 455/513; 455/504; 455/512

(58) Field of Classification Search .............. 55/513; 455/510, 511, 512, 514, 452, 517, 513, 504, 455/515

See application file for complete search history.

(56) References Cited

U.S. PATENT DOCUMENTS 5,960,000 A * 9/1999 Ruszczyk et al. ........... 370/447
6,205,335 B1 * 3/2001 Furusawa et al. ........... 455/436
6,542,481 B2    4/2003 Foore et al.
6,650,872 B1 * 11/2003 Karlsson .................. 455/67.11
6,714,523 B2    3/2004 Zeira et al.
6,987,738 B2 * 1/2006 Subramanian et al. ...... 370/252
6,990,087 B2 * 1/2006 Rao et al. .................. 370/330
7,069,009 B2 * 6/2006 Li et al. ..................... 455/446
7,110,349 B2 * 9/2006 Branlund et al. ........... 370/203
7,116,944 B2 * 10/2006 Das et al. ..................... 455/69
7,310,526 B2 * 12/2007 Sang et al. .................. 455/436
7,349,378 B2 * 3/2008 Elaoud et al. ............... 370/338
2001/0038630 A1   11/2001 Tong et al.
2002/0042275 A1 * 4/2002 Kitazawa et al. ........... 455/452
2003/0104817 A1 * 6/2003 Damnjanovic .............. 455/452

FOREIGN PATENT DOCUMENTS

EP       1193993 A2    4/2002
WO    WO 01/006710 A1  1/2001
WO    PCT/US03/23700   12/2003

OTHER PUBLICATIONS

Beard, et al., "Prioritized Resource Allocation for Stressed Networks", IEEE/ACM Transactions on Networking, IEEE Inc., vol. 9, No. 5, Oct. 2001, pp. 618-633.

* cited by examiner

Primary Examiner—Tilahun B Gesesse
(74) Attorney, Agent, or Firm—Blakely, Sokoloff, Taylor & Zafman LLP

(57) ABSTRACT

Method and system are described to determine a signal quality for nodes of a network. In one embodiment, a signal quality for nodes of a network is determined. The nodes are ranked based on the signal quality. Information from a node at a device is received; the information indicates whether the node is satisfied. In the event the node is satisfied, whether a next ranked node is satisfied is determined. In the event the node is not satisfied, network resources are allocated to the node until the node is satisfied.

19 Claims, 3 Drawing Sheets

METHOD AND SYSTEM FOR ALLOCATION OF RESOURCES WITHIN WIRELESS SYSTEMS

RELATED APPLICATION

This patent application is a divisional application of application Ser. No. 10/211,861, filed Aug. 1, 2002, now U.S. Pat. No. 7,099,682 and priority is claimed thereof.

BACKGROUND

In a system with limited resources and spectrum such as a wireless cellular network, the system determines how to allocate resources to users. In typical voice networks such as 2G systems, users are served on a first come first served basis, as long as the user is in an area that has a minimum signal quality. Future networks are intended to provide more data services over cellular networks, such as 3G systems, so a different criterion other than a minimum signal quality is typically employed. Since data is more tolerable to delays than voice, typical data networks attempt to serve a user when a higher channel quality is present so as to minimize usage of common wireless resources such as spectrum in order to achieve a maximum throughput of the base station. However, systems that allocate resources on the basis of channel quality alone do not accommodate the issue of what rate each user desires.

BRIEF DESCRIPTION OF THE DRAWINGS

The invention may be understood by reference to the following description taken in conjunction with the accompanying drawings in which like reference numerals identify like elements, and in which.

DETAILED DESCRIPTION

Figure 1:
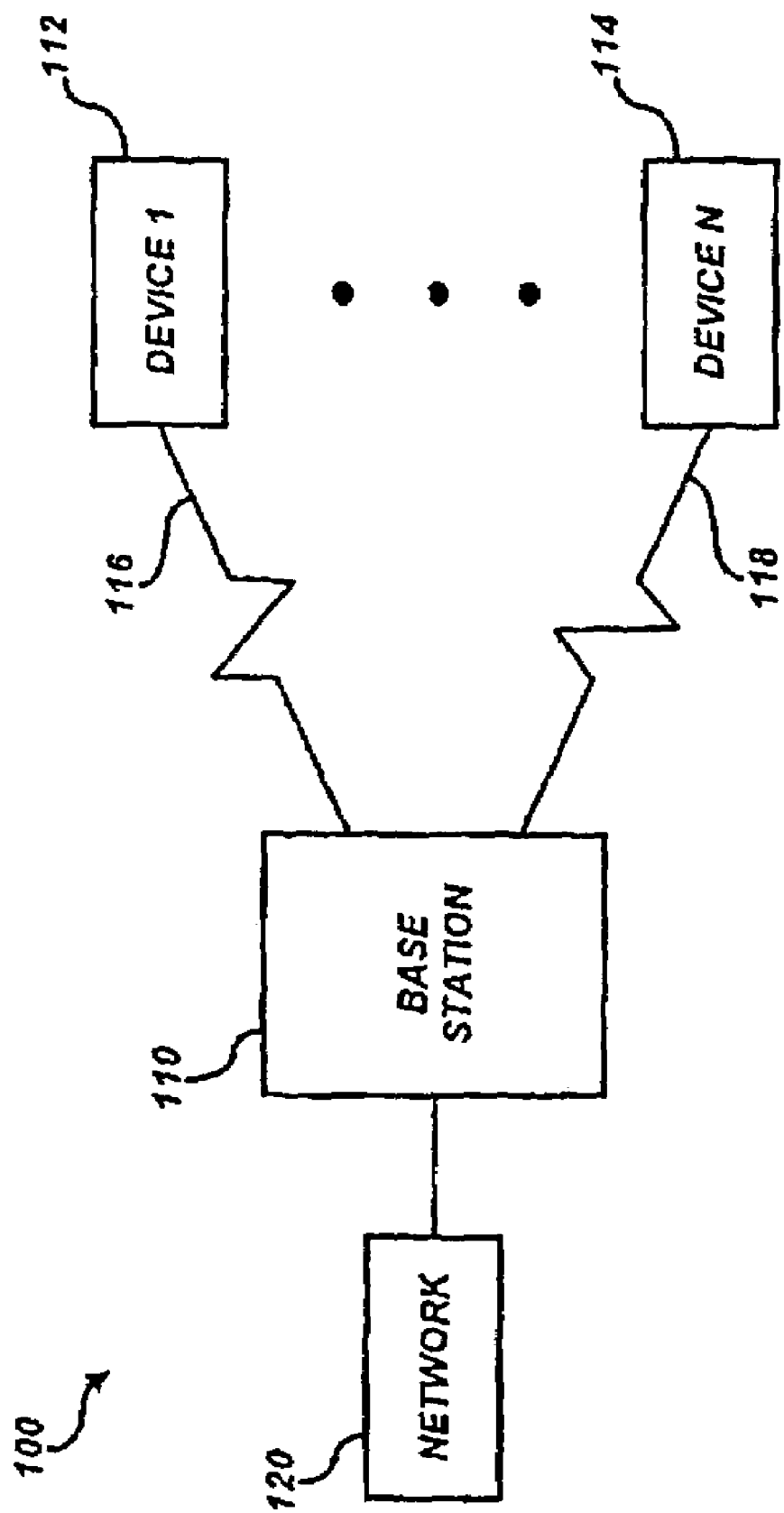
FIG. 1 is a block diagram of a communication system in accordance with the present invention.

Referring now to FIG. 1, a block diagram of a communications system in accordance with an embodiment of present invention will be discussed. In one embodiment, communications system 100 may include a base station 110 that communicates with one or more devices 112-114, over one or more communication links 116-118. In one embodiment, at least one or more of communications links 116-118 may be a wireless link, such as a radio-frequency communications link in a cellular telephone network, although the scope of the present invention is not limited in this respect. Devices 112-114 may be wireless phones, personal digital assistants, computers, pagers, portable music players, or any other device capable of communicating with base station 110 via at least one or more communication links 116-118, although the scope of the present invention is not limited in this respect.

In one embodiment, at least one or more of devices 112-114 may be transportable by a user, such as a hand held device, and may be operated by a user while being hand held or otherwise on the person of the user, such as in a pocket, attached to a belt or holster, and so on. Base station 110 may allow devices 112-114 to communicate with other devices 112-114, and may allow devices 112-114 to communicate via network 120. In one embodiment, network 120 may be a wide area network or world wide network such as the Internet, although the scope of the present invention is not limited in this respect.

In one embodiment, at least one or more of devices 112-114 may be battery operated where the battery serves as a power source during operation, and may alternatively be powered from an external power source such as an ac or dc power source, directly, to charge the battery, or to provide supplemental power to the device, although the scope of the present invention is not limited in this respect. In one embodiment of the invention, communications system 100 may comprise a wireless or a cellular network compliant with at least one or more cellular standards, including but not limited to 3GPP, WCDMA, CDMA 2000, GSM-GPRS, GSM-EGPRS, IEEE Standards 802.11a, 802.11b, and so on, although the scope of the present invention is not limited in this respect. Other wireless standards may be utilized without departing from the scope of the invention and without providing substantial change thereto.

Figure 2:
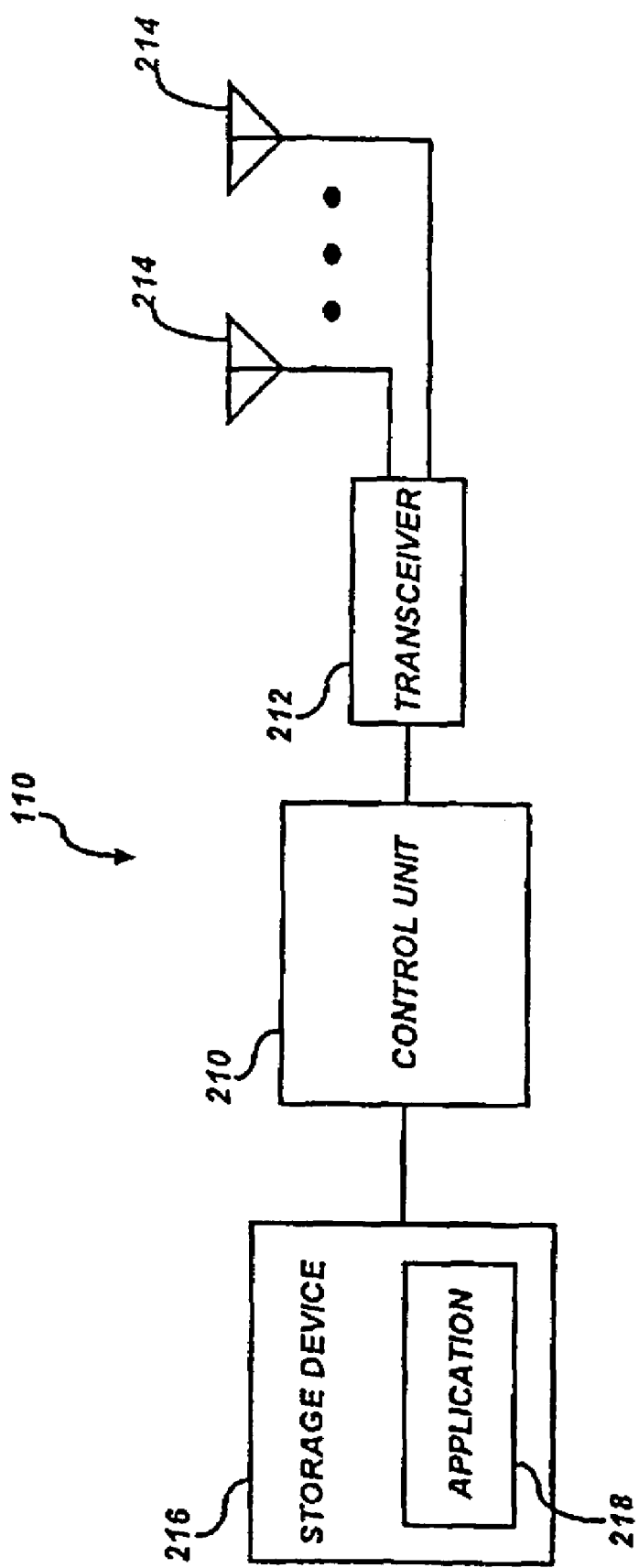
FIG. 2 is a block diagram of a base station in accordance with the present invention.

Referring now to FIG. 2, a block diagram of a base station in accordance with the present invention will be discussed. Base station 110 may include the components as shown in FIG. 2, and alternatively base station 110 may also include more or fewer components without altering the scope of the invention. Base station 110 may include a control unit 210 to control the operation of base station 110. Control unit 210 may include a microprocessor or a controller, although the scope of the present invention is not limited in this respect. A transceiver 212 and optionally included one or more antennas 214 couple with control unit 210 so that base station 110 may communicate with devices 112-114 via a wireless communication link 116-118.

In one embodiment of the invention, although not necessarily all, a storage device 216 may couple to control unit 210 to store an application 218, and also data or other information. Storage device 216 may include a memory device such as semiconductor memory, for example random access memory (RAM), flash memory, a disk drive, or the like, although the scope of the invention is not limited in this respect. Application 218 may adapt control unit 210 so that that base station 110 may operate to allocate resources to devices 112-114 by implementing a method for allocating resources in accordance with the present invention, although the scope of the present invention is not limited in this respect. At least one embodiment of a method for allocating resources to one or more of devices 112-114 is discussed with respect to FIG. 3.

In one embodiment of the invention, delay may refer to the amount of time a packet waits for transmission at the base station, although the scope of the invention is not limited in this respect. In some embodiments of the invention, the delay variation may be a factor rather than the absolute delay. For example, in a voice call the delay may be a factor but in video streaming, e.g., playing an MPEG movie, the initial delay may not be a factor since some amount of data may be buffered prior to playing the movie, for example where the variation does not exceed the buffer size. Rate may refer to the amount of data sent by the transmitter to a user over a certain time interval, typically a few seconds, although the scope of the invention is not limited in this respect.

In one embodiment, base station 110 may obtain data to transmit to the different users, for example from the network or from other devices. The obtained data may be held in queues waiting to be transmitted to the devices. The average data rate may be constant, for example as in video streaming or video call in which the rate requirements are constant and the application may not work properly if it is not maintained, or it may be a best effort as in web browsing or e-mail downloading in which case the rate requirements may reflect a minimal requirement to keep a normal user happy, although the scope of the present invention is not limited in this respect.

Figure 3:
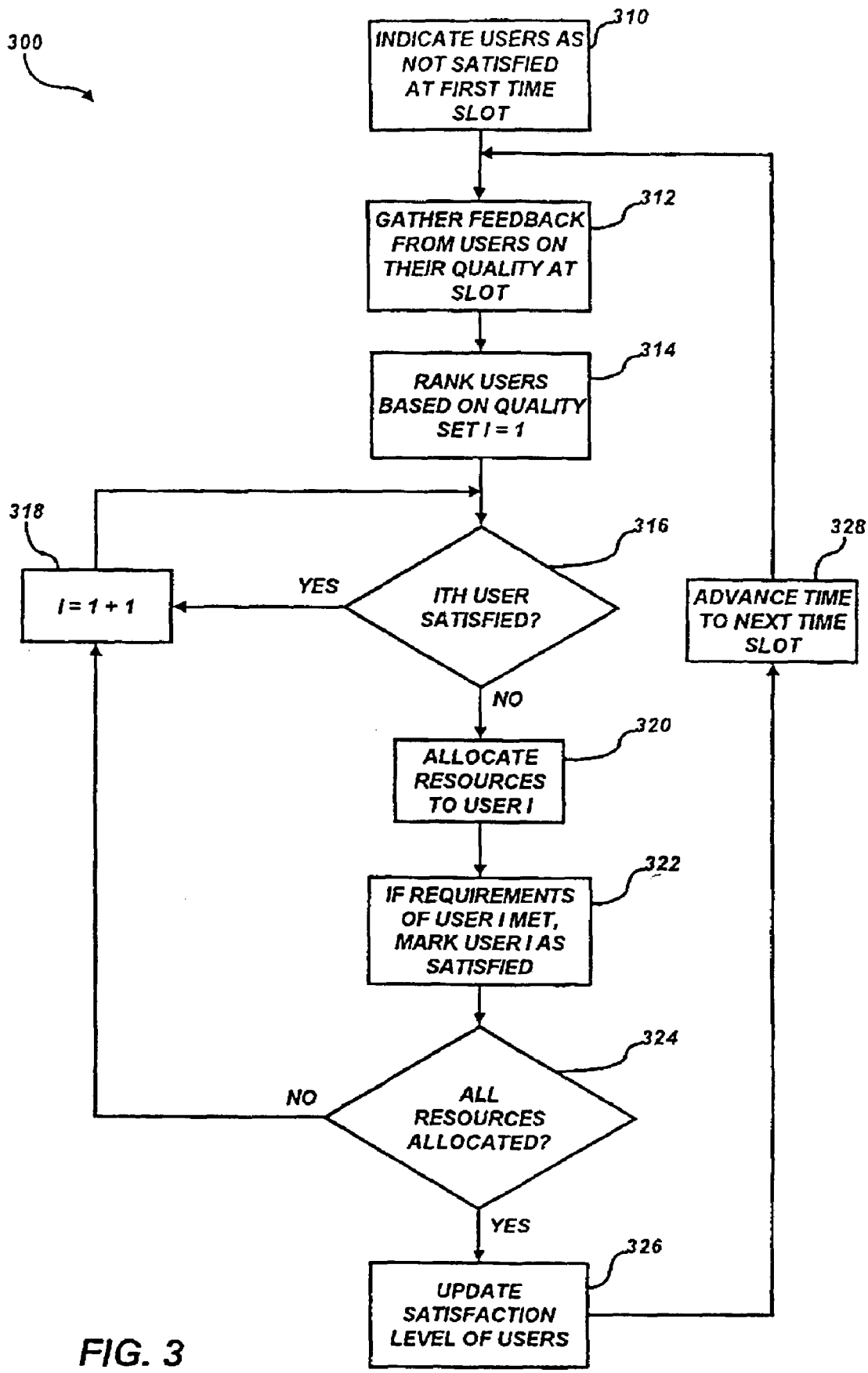
FIG. 3 is a flow diagram of a method for allocating resources in accordance with the present invention.

Referring now to FIG. 3, a method for allocating resources in accordance with the present invention will be discussed. Method 300 may be implemented by application 218 executed by control unit 210 of base station 110. Method 300 starts at block 310 at which users of devices 112-114 are indicated as not satisfied. In at least one embodiment of the invention, a user of one of devices 112-114 may be considered satisfied when at least one desired value of rate or delay are reached or maintained for the user, although the scope of the present invention is not limited in this respect.

In one embodiment of the invention, for example, device 112 may be an audio-based device utilizing a voice messaging application. In such an example, an acceptable data rate may be defined in the range of 4-13 kb/s with a one-way delay time smaller than 1 second. As an example, delay variation may be a factor and may be on the order of 1 millisecond. In this embodiment, the user of device 112 may be defined as being satisfied when base station 110 is capable of providing device 112 with a transmission rate of at least 4 kb/s and a delay time less than or equal to 1 second of delay variation. As another example, device 112 may be capable of utilizing a video application. In such an example, an acceptable data rate may be defined as 384 kb/s (one of many example values) with a startup delay time smaller than 10 seconds. Delay variation may be a factor and may be less than 2 seconds. In this embodiment, the user of device 112 may be defined as being satisfied when base station 110 is capable of providing device 112 with a transmission rate of at least 384 kb/s and a startup delay time less than or equal to 10 seconds of delay variation. Devices 112-114 may have a combination of rate and delay desired values in order to be considered as satisfied, and a combination of one of devices 112-114 need not be similar or identical, although the scope of the invention is not limited in this respect.

In one embodiment of the invention, feedback may be gathered from users based on the signal quality at their slot, at block 312. In a shared environment, communication may be typically done in time periods of constant duration which may be referred to as slots. In the slots, transmission may be scheduled to 0 or more users. A scheduler may decide at which slots transmission occurs to the user, and then which resources are allocated to a user in a particular slot, for example how much power, how many codes, what portion of the frequency, and so on, according to the resources that may be shared. The scheduler also may determine how to deliver the data to the user, for example what modulation to use, what coding scheme to user, and so on, depending upon the physical layer capabilities. Signal quality may refer a measure of the quality of the link between the base station and the device, and may be, for example, the instantaneous Signal to Interference and Noise Ration (SINR) at the device, or the achievable instantaneous rate at the device, although the scope of the present invention is not limited in this respect.

Users may be ranked, at block 314, based on signal quality determined at step 314, and a variable i is set at a value of 1. In one embodiment, users having a higher signal quality may be ranked higher than users having a lower signal quality, although the scope of the invention is not limited in this respect. A determination is made, at block 316, whether user i is satisfied. If user i is satisfied, the variable i may be increased by a value of 1, at block 318, and method 300 continues, at block 316, with the next ranked user. In the event user i is not satisfied, resources are allocated to user i at step 320 until a determination is made at step 322 that the requirements of the user i are met, at which time user i is marked as satisfied. A determination may be made at step 324 whether all resources have been allocated. In the event all resources have not been allocated, variable i may be incremented by a value of 1 at step 318, and method 300 may continue to execute at step 316 with the next user. In the event that all resources are allocated, the satisfaction level of all users may be updated at step 326, and method 300 may continue at step 312 at the next time slot, although the scope of the present invention is not limited in this respect. Time may be advanced to the next time slot at step 328.

In one embodiment of the present invention, such as illustrated in FIG. 3, base station 110 may maintain a maximum number of live calls or communications links according to at least one or more preferences of at least one or more users. As a result, base station 110 may provide a capacity for a number of supported users. Thus, in one embodiment of the invention, base station 110 may utilize a throughput criterion under a constraint of a number of satisfied users although the scope of the present invention is not limited in this respect. In at least one embodiment of the invention, a user may be considered satisfied when at least one or more desired values of rate and delay are maintained for the user, although the scope of the present invention is not limited in this respect.

In one or more alternative embodiments of the invention, method 300 may be modified to provide other optional bases for allocating resources. For example, block 314 may be modified in one embodiment to rank users according to delay, or some variation of delay, for example users having a tighter delay constraint may be ranked higher than users having a less tight delay constraint. A user may be determined to be satisfied at block 316 in the event quality exceeds a predetermined threshold, although the scope of the present invention is not limited in this respect. In another embodiment, block 314 may be modified to rank users according to the delay and the quality. In yet another embodiment, block 314 may be modified to rank users according to a percentage of resources required to keep the user satisfied for the next N time slots, N being a parameter, although the scope of the present invention is not limited in this respect. In a further alternative embodiment, a velocity estimator per user may be provided by making a ranking of delay or quality and delay. In particular, a lower speed user may be given priority over a higher speed user in terms of channel quality, but not on delay. In such an embodiment, a higher speed user may have greater fluctuation in quality, and thus may not stay in a lower quality condition for long time periods, whereas a lower speed user may suffer from longer periods of lower quality, although the scope of the present invention is not limited in this respect.

Although the invention has been described with a certain degree of particularity, it should be recognized that elements thereof may be altered by persons skilled in the art without departing from the spirit and scope of the invention. It is believed that the common resource allocation in a wireless system of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof, and further without providing substantial change thereto. It is the intention of the claims to encompass and include such changes.

What is claimed is:

1. A method comprising:
gathering feedback from users via devices in a network, the feedback is based on a signal quality at a corresponding slot on the network, the slot including a time period of constant duration in which communication occurs;
ranking nodes based on the signal quality;
receiving information from a node at a device indicating whether the node is satisfied;
in the event the node is satisfied, determining whether a next ranked node is satisfied; and
in the event the node is not satisfied, allocating network resources to the node until the node is satisfied.

2. The method of claim 1, wherein a node is determined to be satisfied when at least one of a rate and a delay requirement for the node is provided by the network.

3. The method of claim 1, wherein a node is determined to be satisfied when a minimum rate and delay requirement are provided by the network.

4. The method of claim 1, further comprising allocating network resources until all network resources have been allocated.

5. The method of claim 1, further comprising allocating network resources until all network resources have been allocated, and then continuing to determine a signal quality for nodes of the network.

6. The method of claim 1, wherein the determining includes determining the signal quality for nodes of a wireless network.

7. A machine-readable medium comprising instructions which, when executed, cause a machine to:
gather feedback from users via devices in a network, the feedback is based on a signal quality at a corresponding slot on the network, the slot including a time period of constant duration in which communication occurs;
rank nodes based on the signal quality;
receive information from a node at a device indicating whether the node is satisfied;
in the event the node is satisfied, determine whether a next ranked node is satisfied; and
in the event the node is not satisfied, allocate network resources to the node until the node is satisfied.

8. The machine-readable medium of claim 7, wherein a node is determined to be satisfied when at least one of a rate and a delay requirement for the node is provided by the network.

9. The machine-readable medium of claim 7, wherein a node is determined to be satisfied when a minimum rate and delay requirement are provided by the network.

10. The machine-readable medium of claim 7, wherein the instructions which, when executed, further cause the machine to allocate network resources until all network resources have been allocated.

11. The machine-readable medium of claim 7, wherein the instructions which, when executed, further cause the machine to continually execute until a signal quality being determined for nodes of the network when all network resources have been allocated.

12. An apparatus comprising:
a server system having a base station, the base station to gather feedback from users, the feedback is based on a signal quality at a corresponding slot on a network, the slot including a time period of constant duration in which communication occurs; and
a handset of a node couple to the base station, the handset to transmit information from the node to the base station indicating whether a node preference on the network is satisfied for a communication rate and delay time at a first time slot on the network, and to receive network resources from the base station until the node is satisfied.

13. The apparatus of claim 12, wherein the node is satisfied when at least one of a rate and a delay requirement for the node is provided by the network.

14. The apparatus of claim 12, wherein the node is satisfied when minimum rate and delay requirements are provided by the network.

15. The apparatus of claim 12, wherein the node handset to be allocated resources from the base station is base on one or more parameters selected from the group consisting essentially of delay, quality, a percentage of resources required to keep the node satisfied for a predetermined number of time slots, and velocity.

16. The apparatus of claim 12, wherein the node handset to be allocated resources from the base station is based on whether the node is satisfied until all network resources are allocated.

17. A system comprising:
a server system coupled with devices and storage mediums over a network, the server system having a base station, the base station to
gather feedback from users via the devices in the network, the feedback is based on a signal quality at a corresponding slot on the network, the slot including a time period of constant duration in which communication occurs;
ranking nodes based on the signal quality;
receiving information from a node at a device indicating whether the node is satisfied;
in the event the node is satisfied, determining whether a next ranked node is satisfied; and
in the event the node is not satisfied, allocating network resources to the node until the node is satisfied.

18. The system of claim 17, wherein the node is satisfied when at least one of a rate and a delay requirement for the node is provided by the network.

19. The system of claim 17, wherein the node is satisfied when minimum rate and delay requirements are provided by the network.

* * * * *